(12) United States Patent
Gu et al.

(10) Patent No.: US 10,606,335 B2
(45) Date of Patent: Mar. 31, 2020

(54) SYSTEM AND METHOD FOR DYNAMICALLY ADJUSTING VOLTAGE FREQUENCY

(71) Applicant: VIA Alliance Semiconductor Co., Ltd., Shanghai (CN)

(72) Inventors: Deming Gu, Shanghai (CN); Zhou Hong, Cupertino, CA (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 305 days.

(21) Appl. No.: 15/510,266

(22) PCT Filed: Dec. 12, 2014

(86) PCT No.: PCT/CN2014/093729
§ 371 (c)(1),
(2) Date: Mar. 10, 2017

(87) PCT Pub. No.: WO2016/090642
PCT Pub. Date: Jun. 16, 2016

(65) Prior Publication Data
US 2018/0232033 A1 Aug. 16, 2018

(51) Int. Cl.
*G06F 1/32* (2019.01)
*G06F 1/324* (2019.01)
*G06F 1/3296* (2019.01)

(52) U.S. Cl.
CPC ............ *G06F 1/324* (2013.01); *G06F 1/3296* (2013.01); *Y02D 10/126* (2018.01); *Y02D 10/172* (2018.01)

(58) Field of Classification Search
None
See application file for complete search history.

(56) References Cited

U.S. PATENT DOCUMENTS 7,840,825 B2  11/2010  Altevogt et al.
8,725,488 B2   5/2014  Hofmann et al.
(Continued)

FOREIGN PATENT DOCUMENTS

CN  101187831 A  5/2008
CN  101515196 A  8/2009
(Continued)

OTHER PUBLICATIONS

International Search Report dated Aug. 27, 2015, issued in application No. PCT/CN2014/093729.
(Continued)

*Primary Examiner* — Jaweed A Abbaszadeh
*Assistant Examiner* — Cheri L Harrington
(74) *Attorney, Agent, or Firm* — McClure, Qualey & Rodack, LLP (57) ABSTRACT

A dynamic voltage frequency scaling (DVFS) system is provided. The DVFS system includes: a computation unit, a power management unit (PMU), a hardware activity monitor (HAM), and a hardware voltage monitor (HVM). The HAM monitors a working status and temperature information of the computation unit, and determines whether to update an operating voltage and frequency of the computation unit according to the working status, the temperature information, and a previous determination result. When the HAM determines to update the operating voltage and frequency, the HAM generates a first control signal to the PMU to calibrate the operating voltage and frequency. The HVM detects timing information of the computation unit and determine whether to fine-tune the operating voltage according to the detected timing information. When the HVM determines to fine-tune the operating voltage, the hardware monitor generates a second control signal to the PMU to fine-tune the operating voltage.

14 Claims, 4 Drawing Sheets

(56) References Cited

U.S. PATENT DOCUMENTS

| | | | |
|---|---|---|---|
| 9,223,327 B1* | 12/2015 | Zhu | G05F 1/10 |
| 2004/0201279 A1 | 10/2004 | Templeton | |
| 2005/0210346 A1* | 9/2005 | Comaschi | G06F 1/3203 |
| | | | 714/724 |
| 2006/0172783 A1 | 8/2006 | Leung et al. | |
| 2007/0229054 A1* | 10/2007 | Dobberpuhl | G06F 1/3203 |
| | | | 324/76.11 |
| 2008/0282102 A1 | 11/2008 | Reddy et al. | |
| 2010/0241885 A1 | 9/2010 | He et al. | |
| 2012/0023382 A1* | 1/2012 | Sandhu | G06F 1/324 |
| | | | 714/734 |
| 2013/0313892 A1 | 11/2013 | Chang | |
| 2014/0006818 A1 | 1/2014 | Doshi et al. | |
| 2014/0122850 A1* | 5/2014 | Duron | G06F 1/24 |
| | | | 713/1 |
| 2015/0046685 A1* | 2/2015 | Park | G06F 1/3243 |
| | | | 712/220 |

FOREIGN PATENT DOCUMENTS

| | | |
|---|---|---|
| CN | 101765822 A | 6/2010 |
| TW | I292865 B | 1/2008 |
| TW | I337442 B | 2/2008 |
| TW | I337442 B | 2/2011 |
| TW | 201349795 A | 12/2013 |
| WO | 2009/094709 A1 | 8/2009 |

OTHER PUBLICATIONS

Chinese language Notice of Allowance dated Dec. 29, 2015, issued in application No. TW 104120456.

European Search Report dated May 14, 2018, issued in application No. 14908021.0.

\* cited by examiner

SYSTEM AND METHOD FOR DYNAMICALLY ADJUSTING VOLTAGE FREQUENCY

FIELD OF THE INVENTION

The present invention relates to circuit control, and, in particular, to a dynamic voltage frequency scaling (DVFS) system and associated DVFS method thereof.

BACKGROUND

Currently, DVFS technology has been widely used in various processors, and the DVFS technology is capable of efficiently managing power consumption of an electronic system. The challenge for using the DVFS technology is to determine which operating frequency to use because the operating voltage is also determined by the operating frequency accordingly. The electronic system may have lower power consumption when the operating frequency and operating voltage have been lowered. Conventional DVFS technologies utilize a processor to calibrate the operating frequency and operating voltage by software, and cannot respond to real-time conditions. There is also extra overhead for the software. Accordingly, there is a demand for a DVFS system and associated DVFS method to solve the aforementioned issues in conventional DVFS technologies.

BRIEF SUMMARY OF THE INVENTION

A detailed description is given in the following embodiments with reference to the accompanying drawings.

A dynamic voltage frequency scaling (DVFS) system is provided. The DVFS system includes: a computation unit, a power management unit (PMU), a hardware activity monitor (HAM), and a hardware voltage monitor (HVM). The HAM monitors a working status and temperature information of the computation unit, and determines whether to update an operating voltage and frequency of the computation unit according to the working status, the temperature information, and a previous determination result. When the HAM determines to update the operating voltage and frequency, the HAM generates a first control signal to the PMU to calibrate the operating voltage and frequency. The HVM detects timing information of the computation unit and determine whether to fine-tune the operating voltage according to the detected timing information. When the HVM determines to fine-tune the operating voltage, the hardware monitor generates a second control signal to the PMU to fine-tune the operating voltage.

A dynamic voltage frequency scaling method for use in a dynamic voltage frequency scaling system is provided. The dynamic voltage frequency scaling system includes a computation unit, a hardware activity monitor, a hardware voltage monitor, and a power management unit. The method includes the steps of: utilizing the hardware activity monitor to monitor a working status and temperature information of the computation unit; utilizing the hardware activity monitor to determine whether to update an operating voltage and an operating frequency of the computation unit according to the working status, the temperature information, and a previous determination result; utilizing the hardware activity monitor to generate a first control signal to the power management unit to calibrate the operating voltage and the operating frequency when the hardware activity monitor determines to update the operating voltage and the operating frequency; utilizing the hardware voltage monitor to detect timing information of the computation unit and determine whether to fine-tune the operating voltage according to the timing information; and utilizing the hardware voltage monitor to generate a second control signal to the power management unit to calibrate the operating voltage when the hardware voltage monitor determines to fine-tune the operating voltage.

BRIEF DESCRIPTION OF THE DRAWINGS

The present invention can be more fully understood by reading the subsequent detailed description and examples with references made to the accompanying drawings, wherein.

BRIEF DESCRIPTION OF THE SYMBOLS

100~dynamic voltage frequency scaling system;
110~computation unit;
111A-111D~processor;
112~thermal sensor;
120~hardware activity monitor;
121~event counting circuit;
121A-121D~event counter;
122~workload computation unit;
123~calibration prediction circuit;
130~hardware voltage monitor;
131A-131D~detection circuit;
132~control circuit;
133~state determination circuit;
134~timer circuit;
135~time-out determination circuit;
136~decoding circuit;
137~status register;
140~power management unit;
142~DVFS module;
143A~DVFS logic circuit;
143B~DVFS look-up table;
144~adaptive voltage scaling module;
145A~AVS logic circuit;
145B~AVS look-up table;
146~phase-locked loop circuit;
148~power management IC;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
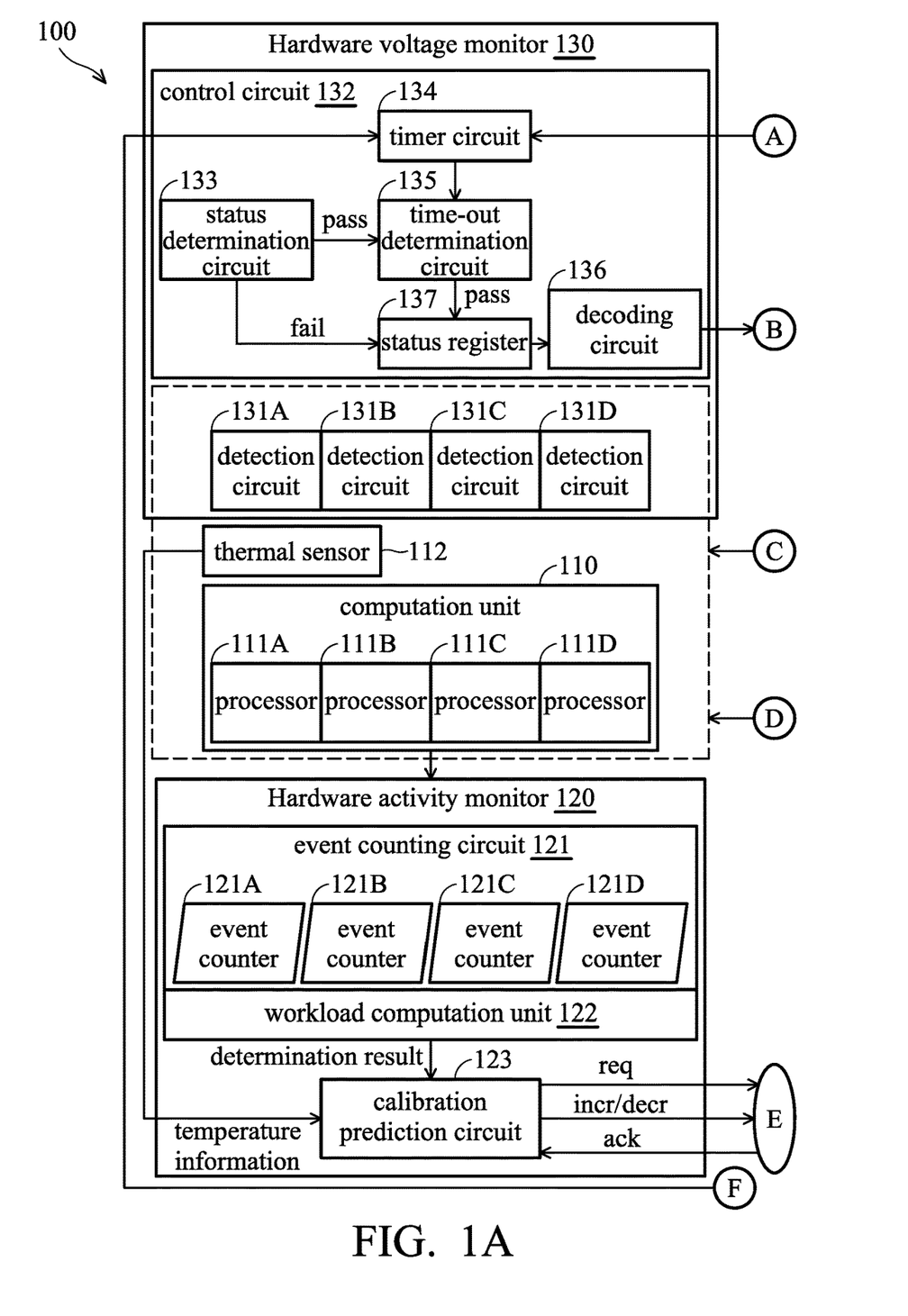
FIGS. 1A and 1B are portions of a block diagram illustrating a DVFS system in accordance with an embodiment of the invention.
Figure 1B:
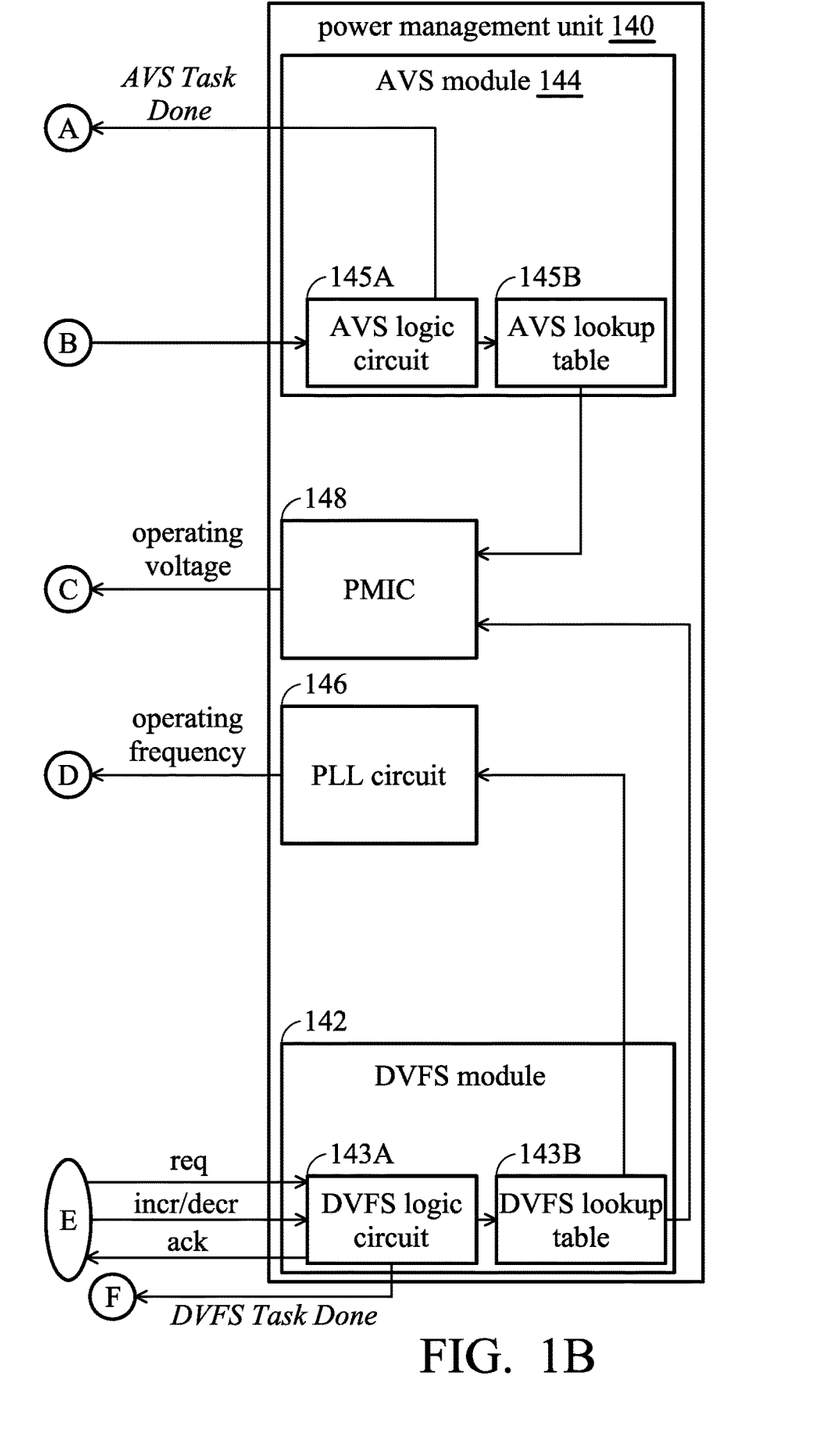

FIGS. 1A and 1B are portions of a block diagram illustrating a DVFS system in accordance with an embodiment of the invention. The DVFS system 100 comprises a computation unit 110, a hardware activity monitor (HAM) 120, a hardware voltage monitor (HVM) 130, and a power management unit (PMU) 140. The computation unit 110 comprises one or more processing units 111A~111D, and a thermal sensor 112. The processing units 111A~111D can be implemented by central processing units (CPU), graphics processing units (GPU), image signal processors (ISP), or video processing processors (VPP). The DVFS method provided in the invention can be applied to processors in different types and quantities, and the invention is not limited to the aforementioned embodiment. In addition, the processing units 111A~111D can also be implemented by different cores in the same processor. The thermal sensor is configured to detect temperature information of the computation unit 110.

In an embodiment, the HAM 120 comprises an event counting circuit 121, a workload computation unit 122, and a calibration prediction circuit 123. The event counting circuit 121 comprises event counters 121A~121D, which are used to detect activities or events of internal pipelines, arithmetic logic units, or decoders in the processing units 111A, 111B, 111C, and 111D, respectively. In other words, the event counters 121A~121D detect the real workload of the processing units 111A-111D rather than the working status of the processing units 111A~111D externally. The workload computation unit 122 is configured to compare the detected workload information from the event counters 121A~121D with a predetermined threshold, thereby generating a workload determination result, wherein the value of the predetermined threshold is pre-stored in a register, which can be set by the user manually. The calibration prediction circuit 123 calculates a current DVFS determination result according to the previous DVFS determination result, the temperature information, and current configurations (e.g. the detecting period of the calibration prediction circuit 123). The calibration prediction circuit 123 further determines whether to update settings of the operating voltage and the operating frequency by determining the relationship between the current DVFS determination result and the previous DVFS determination result.

Specifically, the HAM 120 determines whether the current performance of the processing units 111A~111D complies with the current settings of the operating voltage and operating frequency. If the performance of the processing units 111A~111D complies with the current settings of the operating voltage and operating frequency, the power management unit 140 keeps the current settings of the operating voltage and operating frequency. If the performance of the processing units 111A~111D does not comply with the current settings of the operating voltage and operating frequency, the HAM 120 further determines whether to increase or lower the operating voltage and operating frequency, and informs the power management unit 140 to perform corresponding calibration of the operating voltage and operating frequency.

For example, the calibration prediction circuit 123 may record N previous DVFS determination results. When the calibration prediction circuit 123 determines that the performance of the computation unit 110 should be decreased, a conservative method is used to calibrate the operating voltage and operating frequency. For example, when the calibration prediction circuit 123 generates N successive DVFS determination results to reduce the performance of the computation unit 110, the calibration prediction circuit 123 then informs the power management unit 140 to reduce the operating voltage and operating frequency of the computation unit 110, wherein N is an adjustable positive integer. When the calibration prediction circuit 123 determines that the performance of the computation unit 110 should be increased, the calibration prediction circuit 123 directly informs the power management unit 140 to increase the operating voltage and operating frequency of the computation unit.

The HVM 130 comprises detection circuits 131A~131D, and a control circuit 132. The detection circuits 131A~131D is configured to estimate and detect timing of the processing units 111A~111D. The control circuit 132 is configured to determine whether to fine-tune the operating voltage and operating frequency according to the detected timing and a task done signal from the power management unit 140. If it is determined to fine-tune the operating voltage and operating frequency, the control circuit 132 generates a control signal to control the power management unit 140 to gradually update the operating voltage and operating frequency of the computation unit 110, such as increasing or decreasing the operating voltage and the operating frequency. It should be noted that the computation unit 110, the detection circuits 131A~131D, and the thermal sensor 112 is within a voltage domain, such as the region within the dashed lines shown in FIG. 1A and FIG. 1B.

In an embodiment, the control circuit 132 comprises a status determination circuit 133, a timer circuit 134, a time-out determination circuit 135, a decoding circuit 136, and a status register 137. The status determination circuit 133 determines whether the timing information from the detection circuits 131A~131D complies with the current operating voltage of the computation unit 110. That is, the status determination circuit 133 determines whether the performance of the computation unit 110 is sufficient or not. If the performance is sufficient, the status determination circuit outputs a pass flag to the time-out determination circuit 135. If the performance is not sufficient, the status determination circuit 133 outputs a fail flag to the status register 137.

When the status determination circuit 133 outputs the pass flag to the time-out determination circuit 135, the time-out determination circuit 135 further determines whether the pass flag remains consistent during the current detecting period. If the time-out determination circuit 135 determines that the pass flag remains consistent during the current detecting period, the time-out determination circuit 135 outputs a pass result to the status register 137. If the time-out determination circuit 135 determines that the pass flag does not remain consistent during the current detecting period, the time-out determination circuit 135 directly outputs a "fail" result to the status register 137. Subsequently, the decoding circuit 136 performs decoding on the AVS determination results stored in the status register 137 to inform the power management unit 140 to increase or decrease the current operating voltage.

The power management unit 140 comprises a DVFS module 142, an adaptive voltage scaling (AVS) module 144, a phase-locked loop (PLL) circuit 146, and a power management integrated circuit (PMIC) 148. The PLL circuit 146 and the PMIC 148 are configured to provide the operating frequency and the operating voltage to the computation unit 110, respectively. The DVFS module 142 comprises a DVFS logic circuit 143A and a DVFS look-up table 143B. The AVS module 144 comprises an AVS logic circuit 145A and an AVS look-up table 145B. The DVFS look-up table 143B records a plurality of configurations of the operating voltage and operating frequency of the computation unit 110. The AVS look-up table 145B records a plurality of configurations of the operating voltage for voltage fine-tuning.

The DVFS logic circuit 143A receives a first control signal (e.g. a setting updating request signal req and a increment/decrement signal incr/decr) from the calibration prediction circuit 123, retrieves the most close or most appropriate operating voltage and operating frequency from the DVFS look-up table 143B, and then informs the PLL circuit 146 and the PMIC 148 to increase or decrease the operating voltage and operating frequency of the computation unit 110. When the DVFS logic circuit 143A has completed calibrating the operating voltage and the operating frequency of the computation unit 110, the DVFS logic circuit 143A transmits a response signal ack to the calibration prediction circuit 123, and transmits a task completion signal DVFS task done to the timer circuit 134 of the HVM 130. Then, the PLL circuit 146 and the PMIC 148 calibrate the operating frequency and the operating voltage of the computation unit 110 according to the results obtained from the DVFS look-up table 143B.

In an embodiment, when the HAM 120 has detected that the operating voltage and the operating frequency are calibrated due to changes of the workload or temperature information, the HVM 130 correspondingly fine-tunes the operating voltage of the computation unit 110 after the DVFS logic circuit 143A has completed each calibration procedure of the operating voltage and operating frequency of the computation unit 110.

Specifically, the decoding circuit 136 determines whether to increase or decrease the operating voltage of the computation unit 110 according to the current AVS determination result and the previous AVS determination result stored in the status register 137. If the current AVS determination result is a pass ("pass"), the decoding circuit 136 further determines whether the previous AVS determination result is a pass ("pass") or a failure ("fail"). When the decoding circuit 136 determines that both the current AVS determination result and the previous AVS determination result are a pass, the decoding circuit 136 transmits a second control signal (e.g. a voltage decrement control signal) to the AVS logic circuit 145A to reduce the operating voltage of the computation unit 110. The AVS logic circuit 145A then retrieves the values of the operating voltage to be calibrated from the AVS look-up table 145B. When the decoding circuit 136 determines that the current AVS determination result is "pass" and the previous AVS determination result is a failure, it indicates that it is not appropriate to lower the performance of the computation unit 110 under current conditions. Meanwhile, the AVS logic circuit 145A does not fine-tune the operating voltage of the computation unit 110.

When the decoding circuit 136 determines that the current AVS determination result is "fail", the decoding circuit 136 transmits a second control signal (e.g. a voltage increment control signal) to the AVS logic circuit 145A to increase the operating voltage of the computation unit 110. The AVS logic circuit 145A then retrieves the values of the operating voltage to be calibrated from the AVS look-up table 145B. Specifically, during fine-tuning of the operating voltage, no matter the operating voltage of the computation unit 110 is increased or decreased, the PMIC 148 fine-tunes the operating voltage of the computation unit 110 based on the results retrieved from the AVS look-up table 145B. When the fine-tuning of the operating voltage of the computation unit 110 is completed, the AVS logic circuit 145A transmits a task completion signal AVS Task Done to the timer circuit 134.

In view of the above, the HAM 120 calibrates the operating voltage and operating frequency of the computation unit 110 with a larger step via open-looped DVFS technology. When the HAM 120 has completed calibration of the operating voltage and operating frequency of the computation unit 110, the control circuit 132 may detect the feedback information (e.g. the timing) of the operating voltage and operating frequency of the computation unit 110 by the detection circuits 131A~131D. When the control circuit 132 determines that the operating voltage of the computation unit 110 should be fine-tuned, the control circuit 132 then fine-tunes the operating voltage of the computation unit 110 via closed-loop DVFS technology. The control circuit 132 gradually fine-tunes the current operating voltage of the computation unit 110 until the current operating voltage complies with the minimum operating voltage under the current operating frequency.

Figure 2A:
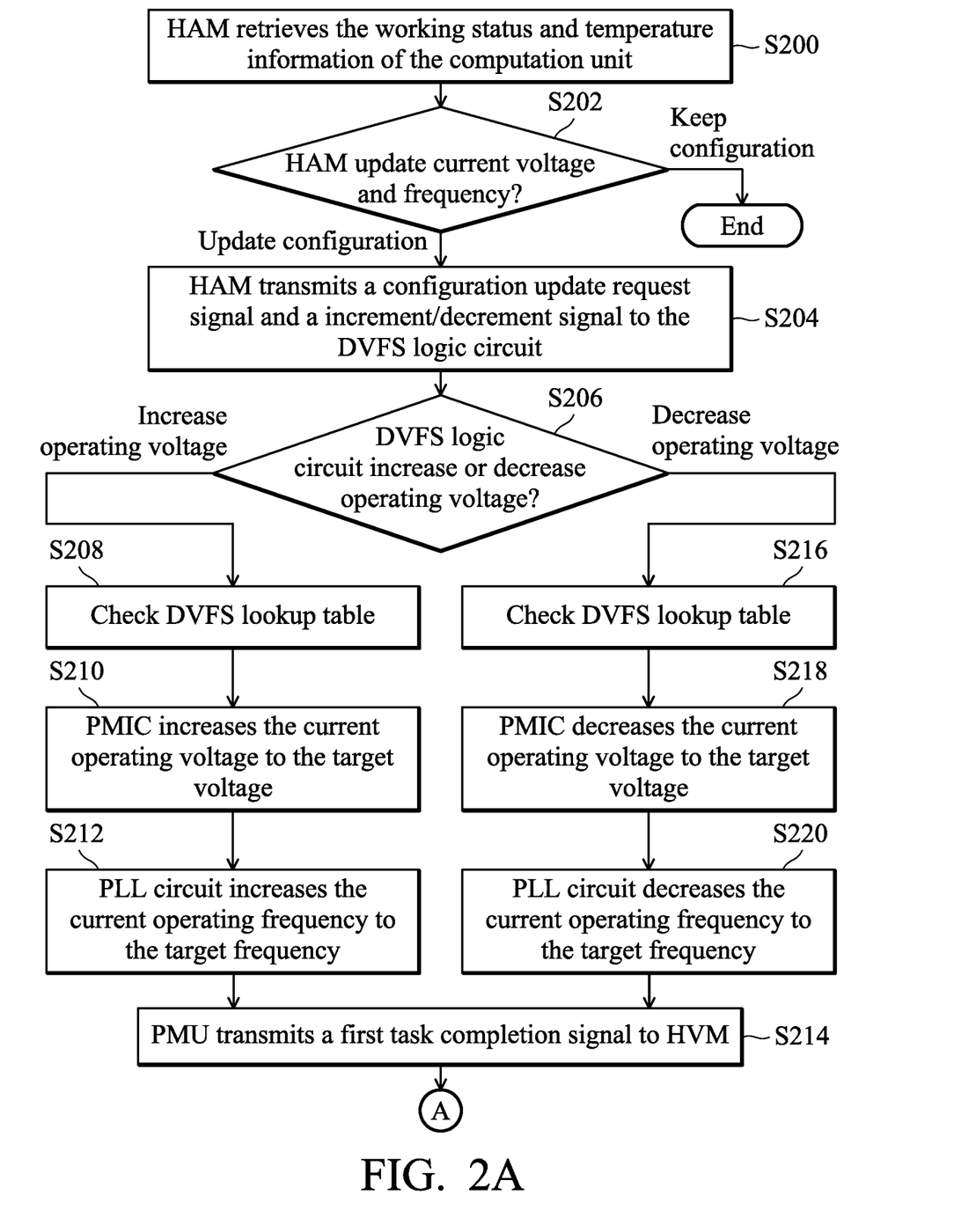
FIGS. 2A and 2B are portions of a flow chart illustrating a DVFS method in accordance with an embodiment of the invention.
Figure 2B:
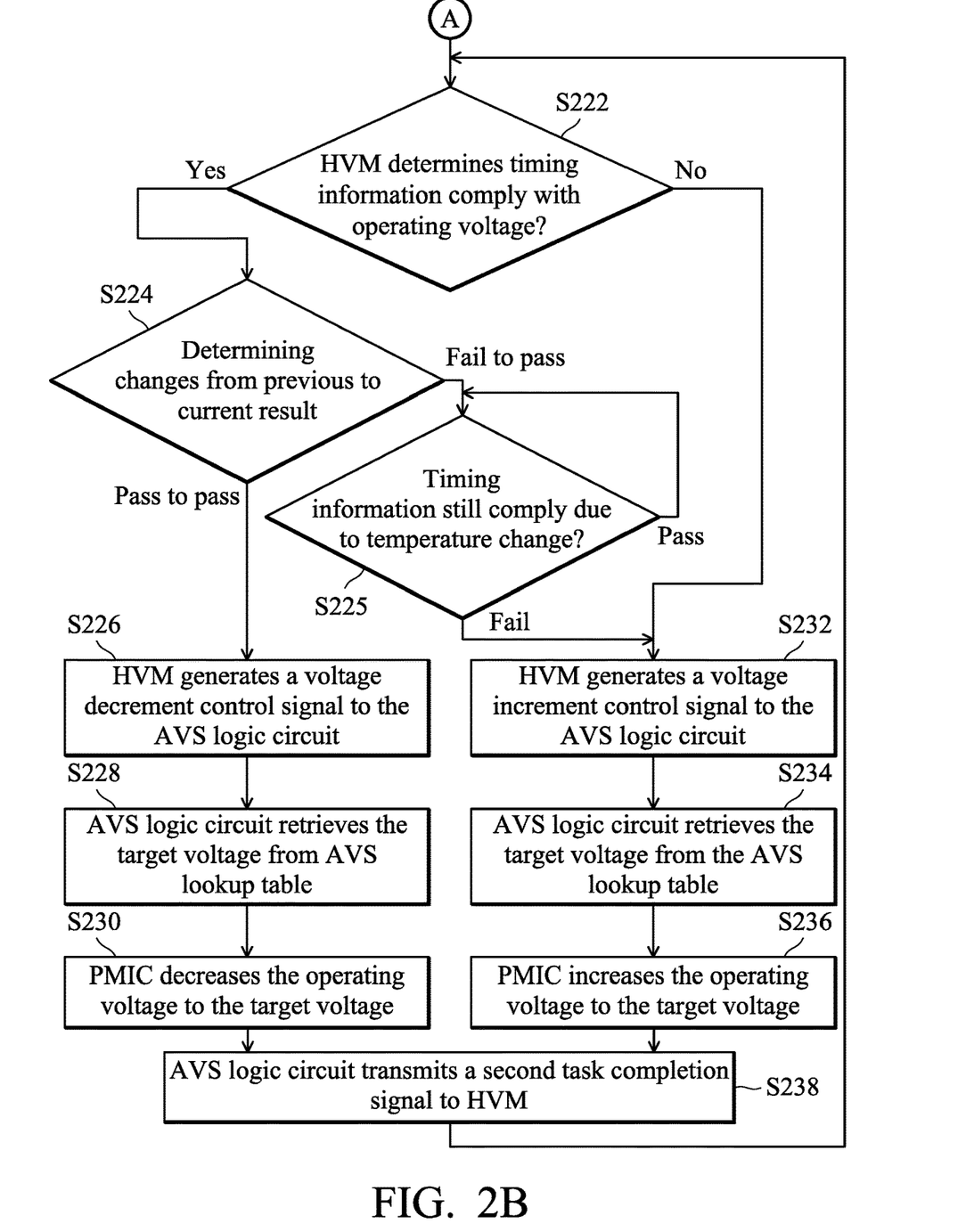

FIGS. 2A and 2B are portions of a flow chart illustrating a DVFS method in accordance with an embodiment of the invention. Referring to FIGS. 1A, 1B, 2A, and 2B, in step S200, the HAM 120 retrieves a working status and temperature information of the computation unit 110. In step S202, the HAM 120 determines whether to update the configuration of the current operating voltage and current operating frequency. If the HAM 120 determines not to update the configuration of the current operating voltage and current operating frequency, the flow ends. If the HAM 120 determines to update the configuration of the current operating voltage and current operating frequency, the HAM 120 transmits a configuration update request signal and a increment/decrement signal to the DVFS logic circuit 143A (step S204).

In step S206, the DVFS logic circuit 143A determines whether to increase or decrease the operating voltage based on the increment/decrement signal. If the DVFS logic circuit 143A determines to increase the operating voltage, the DVFS logic circuit 1434A retrieves the target voltage and target frequency from a sub lookup table associated with increasing the operating voltage in the DVFS lookup table 143B (step S208). In step S210, the PMIC 148 increases the current operating voltage to the target voltage. In step S212, the PLL circuit 146 increases the current operating frequency to the target frequency. In step S214, the PMIC 140 transmits a task completion signal to the HVM 130.

If the DVFS logic circuit 143A determines to decrease the operating voltage, the DVFS logic circuit 143A retrieves the target voltage and target frequency from the sub lookup table associated with decreasing the operating voltage in the DVFS lookup table 143B (step S216). In step S218, the PMIC decreases the current operating voltage to the target voltage. In step S220, the PLL circuit 146 decreases the current operating frequency to the target frequency. After the calibration of the operating voltage and operating frequency is completed, the power management unit 140 transmits a first task completion signal (e.g. DVFS Task Done) to the HVM 130 (step S214).

In step S222, the HVM 130 determines whether the timing information of the computation unit 110 complies with the current operating voltage of the computation unit 110. As described in aforementioned embodiments, the state determination circuit 133 determines whether the timing information from the detection circuits 131A~131D complies with the current operating voltage. If the timing information complies with the current operating voltage, the status determination circuit 133 outputs a pass flag to the time-out determination circuit 135. If the timing information does not comply with the current operating voltage, the status determination circuit 133 directly output a fail flag to the status register 137. When the status determination circuit 133 outputs the pass flag to the time-out determination circuit 135, the time-out determination circuit 135 further determines whether the pass flag from the status determination circuit 133 remains consistent during the current detection period. If the time-out determination circuit 135 determines that the pass flag remains consistent during the current detecting period, the time-out determination circuit 135 outputs a pass result to the status register 137. If the time-out determination circuit 135 determines that the pass flag does not remain consistent during the current detecting period, the time-out determination circuit 135 directly output a fail result to the status register 137.

If the timing information complies with the current operating voltage of the computation unit 110 (i.e. a "pass" result), the HVM 130 further determines the change from the previous AVS determination result to the current AVS determination result (step S224). If the change is from fail to pass, step S225 is performed. If the change is from pass to pass, the HVM generates a voltage decrement control signal to the AVS logic circuit 145A (step S226). In step S225, the HVM 130 further determines whether the timing information still complies with the current operating voltage due to temperature changes. When the timing information still complies with the current operating voltage due to temperature changes, step S232 is performed. When the timing information does not comply with the current operating voltage due to temperature changes, step S225 is performed. In step S228, the AVS logic circuit 145A retrieves the target voltage from the AVS lookup table 145B. In step S230, the PMIC 148 decreases the operating voltage of the computation unit 110 to the target voltage.

If the timing information does not comply with the current operating voltage of the computation unit 110 (i.e. a "fail" result), the HVM 130 generates a voltage increment control signal to the AVS logic circuit 145A (step S232). In step S234, the AVS logic circuit 145A retrieves the target voltage from the AVS lookup table 145B. In step S236, the PMIC 148 increases the operating voltage of the computation unit 110 to the target voltage.

In step S238, the AVS logic circuit 145A transmits a second task completion signal (e.g. AVS Task Done) to the HVM 130, and step S222 is performed repeatedly to determine whether to fine-tune the operating voltage of the computation unit 110. It should be noted that step S222 is triggered by both the first task completion signal (DVFS Task Done) and the second task completion signal (AVS Task Done). In addition, the DVFS system 100 may go back go step S200 at every new detection period to calibrate the operating voltage and operating frequency after the flow ends or in the determination loop of step S225.

In view of the above, a DVFS system and associated DVFS method is provided in the invention. The hardware closed-loop DVFS system may remove the extra overhead of the software. When the computation unit has a low workload or waits for inputting data, the DVFS system is capable of reducing the operating voltage and operating frequency of the computation unit without losing performance. In addition, the DVFS system also has thermal self-feedback, and adopts configurable hardware DVFS strategies to predict the requirements in most power management cases.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamic voltage frequency scaling (DVFS) system, comprising:
a computation unit;
a power management unit;
a hardware activity monitor circuit, configured to monitor a working status and temperature information of the computation unit, and determine whether to update an operating voltage and an operating frequency of the computation unit according to the working status, the temperature information, and a previous DVFS determination result, wherein when the hardware activity monitor circuit determines to update the operating voltage and operating frequency of the computation unit, the hardware activity monitor circuit generates a first control signal to the power management unit to calibrate the operating voltage and the operating frequency; and
a hardware voltage monitor circuit, configured to detect timing information of the computation unit and determine whether to tune the operating voltage according to the detected timing information,
wherein when the hardware voltage monitor circuit determines to tune the operating voltage, the hardware voltage monitor circuit generates a second control signal to the power management unit to tune the operating voltage,
wherein the hardware voltage monitor comprises:
a status register;
a detection circuit, configured to detect timing information of the computation unit
a status determination circuit, configured to determine whether the timing information complies with the operating voltage;
a timer circuit, wherein the timer circuit starts to measure time every time the power management unit has completed calibration of the operating voltage and the operating frequency of the computation unit according to the first control signal;
a time-out determination circuit and
a decoding circuit, configured to determine whether to tune the operating voltage of the computation unit according to a current adaptive-voltage-scaling (AVS) determination result generated by the time-out determination circuit and a previous AVS determination result stored in the status register,
wherein when the status determination circuit determines that the timing information complies with the operating voltage, the time-out determination circuit determines whether the timing information consistently complies with the operating voltage during a current detection period,
if so, the time-out determination circuit sets the current AVS determination result as a pass and stores the current AVS determination result to the status register,
if not, the time-out determination circuit sets the current AVS determination result as a failure, and stores the current AVS determination result to the status register,
wherein when the decoding circuit determines to tune the operating voltage of the computation unit, the decoding circuit generates the second control signal to the power management unit to tune the operating voltage,
wherein when the decoding circuit determines that both the current AVS determination result and the previous AVS determination result are a pass, the second control signal generated by the decoding circuit controls the power management unit to decrease the operating voltage, wherein when the decoding circuit determines that the current AVS determination result is a pass and the previous AVS determination result is a failure, the decoding circuit does not tune the operating voltage, wherein when the decoding circuit determines that the current AVS determination result is a failure, the second control signal generated by the decoding circuit controls the power management unit to increase the operating voltage.

2. The system as claimed in claim 1, wherein the computation unit comprises one or more processors.

3. The system as claimed in claim 1, wherein the working status indicates workload information of the computation unit.

4. The system as claimed in claim 3, wherein the hardware activity monitor circuit comprises:
an event counting circuit configured to detect the workload information of the computation unit;
a workload computation circuit, configured to compare the workload information with a predetermined threshold to generate a workload determination result; and
a calibration prediction circuit, configured to generate a current DVFS determination result according to the workload determination result, the temperature information, and a current configuration, and determine whether to update the operating voltage and the operating frequency of the computation unit by determining the relationship between the current DVFS determination result and the previous DVFS determination result;
wherein when the calibration prediction circuit determines to update the operating voltage and the operating frequency of the computation unit, the calibration prediction circuit generates the first control signal to the power management unit to calibrate the operating voltage and the operating frequency of the computation unit.

5. The system as claimed in claim 4, wherein when the calibration prediction circuit determines that both the current DVFS determination result and the previous DVFS determination result are a pass, the calibration prediction circuit determines to decrease the operating voltage and the operating frequency of the computation unit,
wherein when the calibration prediction circuit determines that the current DVFS determination result is a failure, the calibration prediction circuit determines to increase the operating voltage and the operating frequency of the computation unit.

6. The system as claimed in claim 1, wherein the detection circuit and the computation unit is within the same voltage domain.

7. The system as claimed claim 1, wherein the power management unit comprises:
a dynamic voltage frequency scaling circuit, configured to calibrate the operating voltage and the operating frequency of the computation unit according to the first control signal;
an adaptive voltage scaling circuit, configured to tune the operating voltage of the computation unit according to the second control signal;
a phase-locked loop circuit, configured to provide the operating frequency to the computation unit; and
a power management integrated circuit, configured to provide the operating voltage to the computation unit.

8. A dynamic voltage frequency scaling (DVFS) method, for use in a dynamic voltage frequency scaling system, wherein the dynamic voltage frequency scaling system comprises a computation unit, a hardware activity monitor circuit, a hardware voltage monitor circuit, and a power management unit, the method comprising:
utilizing the hardware activity monitor circuit to monitor a working status and temperature information of the computation unit;
utilizing the hardware activity monitor circuit to determine whether to update an operating voltage and an operating frequency of the computation unit according to the working status, the temperature information, and a previous DVFS determination result;
utilizing the hardware activity monitor circuit to generate a first control signal to the power management unit to calibrate the operating voltage and the operating frequency when the hardware activity monitor circuit determines to update the operating voltage and the operating frequency;
utilizing the hardware voltage monitor circuit to detect timing information of the computation unit and determine whether to tune the operating voltage according to the timing information; and
utilizing the hardware voltage monitor circuit to generate a second control signal to the power management unit to calibrate the operating voltage when the hardware voltage monitor circuit determines to tune the operating voltage,
wherein the hardware voltage monitor circuit comprises a status register, a detection circuit, a status determination circuit, a timer circuit, a time-out determination circuit, and a decoding circuit, and the method further comprises:
utilizing the detection circuit to detect timing information of the computation unit;
utilizing the status determination circuit to determine whether the timing information complies with the operating voltage;
utilizing the timer circuit to start measuring time every time when the power management unit has completed calibration of the operating voltage and the operating frequency of the computation unit according to the first control signal;
utilizing the time-out determination circuit to determine whether the timing information consistently complies with the operating voltage during a current detection period when the status determination circuit determines that the timing information complies with the operating voltage;
if so, utilizing the time-out determination circuit to set a current adaptive-voltage-scaling (AVS) determination result as a pass and store the current AVS determination result to the status register;
if not, utilizing the time-out determination circuit to set the current AVS determination result as a failure, and store the current AVS determination result to the status register;
utilizing the decoding circuit to determine whether to tune the operating voltage of the computation unit according to the current AVS determination result from the time-out determination circuit and a previous determination result stored in the status register; and
utilizing the decoding circuit to generate the second control signal to the power management unit to tune the operating voltage when the decoding circuit determines to tune the operating voltage of the computation unit,
wherein the method further comprises:
utilizing the second control signal generated by the decoding circuit to control the power management unit to decrease the operating voltage when the decoding circuit determines that both the current AVS determination result and the previous AVS determination result are a pass;

keeping the operating voltage unchanged when the decoding circuit determines that the current AVS determination result is a pass and the previous AVS determination result is a failure; and utilizing the second control signal generated by the decoding circuit to control the power management unit to increase the operating voltage when the decoding circuit determines that the current AVS determination result is a failure.

9. The method as claimed in claim 8, wherein the computation unit comprises one or more processors.

10. The method as claimed in claim 8, wherein the working status indicates workload information of the computation unit.

11. The method as claimed in claim 8, wherein the hardware activity monitor comprises an event counting circuit, a workload computation unit, and a calibration prediction circuit, and the method further comprises:

utilizing the event counting circuit to detect the workload information of the computation unit;

utilizing the workload computation circuit to compare the workload information with a predetermined threshold to generate a workload determination result;

utilizing the calibration prediction circuit to generate a current DVFS determination result according to the workload determination result, the temperature information, and a current configuration, and determine whether to update the operating voltage and the operating frequency of the computation unit based on the relationship between the current DVFS determination result and the previous DVFS determination result; and utilizing the calibration prediction circuit to generate the first control signal to the power management unit to calibrate the operating voltage and the operating frequency of the computation unit when the calibration prediction circuit determines to update the operating voltage and the operating frequency of the computation unit.

12. The method as claimed in claim 11, further comprising:

utilizing the calibration prediction circuit to determine to decrease the operating voltage and the operating frequency of the computation unit when the calibration prediction circuit determines that both the current DVFS determination result and the previous DVFS determination result are a pass; and utilizing the calibration prediction circuit to determine to increase the operating voltage and the operating frequency of the computation unit when the calibration prediction circuit determines that the current DVFS determination result is a failure.

13. The method as claimed in claim 8, wherein the detection circuit and the computation unit is within the same voltage domain.

14. The method as claimed claim 8, wherein the power management unit comprises a dynamic voltage frequency scaling circuit, an adaptive voltage scaling circuit a phase-locked loop circuit, and a power management integrated circuit, and the phase-locked loop circuit provides the operating frequency to the computation unit, and the power management integrated circuit provides the operating voltage to the computation unit, and the method further comprises:

utilizing the dynamic voltage frequency scaling circuit to calibrate the operating voltage and the operating frequency of the computation unit according to the first control signal; and utilizing the adaptive voltage scaling circuit to tune the operating voltage of the computation unit according to the second control signal.

\* \* \* \* \*